No. 680,221. Patented Aug. 13, 1901.
O. A. BRONSON.
COIN CONTROLLED WEIGHING DEVICE.
(Application filed Nov. 16, 1900.)
(No Model.) 4 Sheets—Sheet 1.
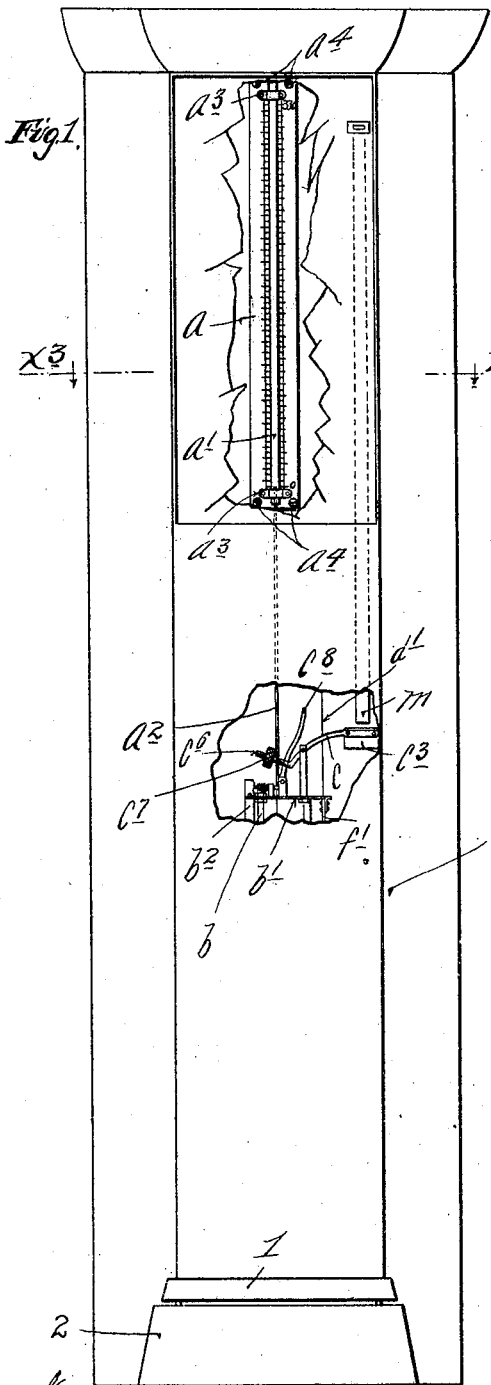
Witnesses,
Harry Kilgord,
C. H. Turner.
Inventor,
Otto A. Bronson,
By his Attorneys,
Williamson & Merchant

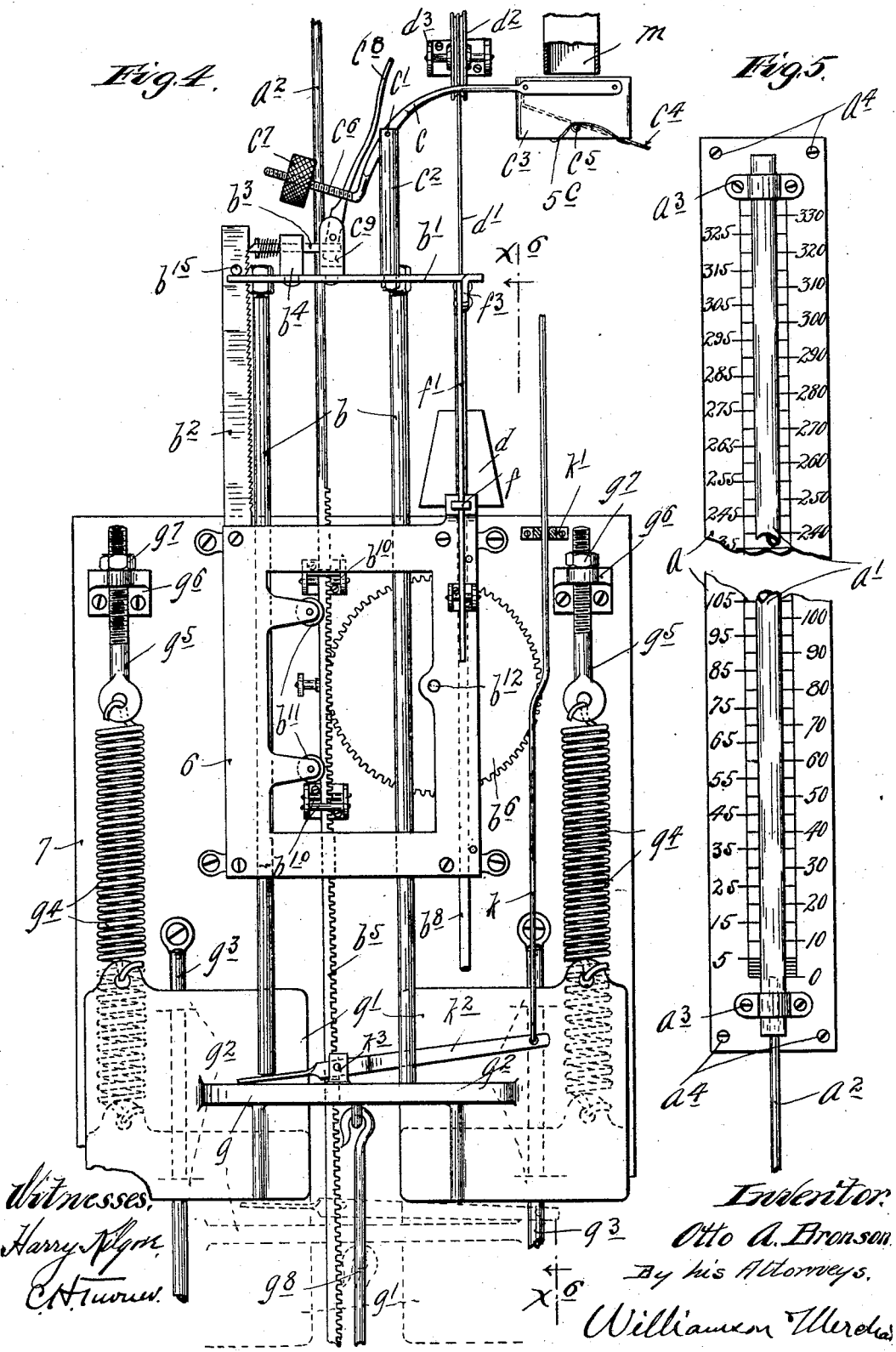

No. 680,221. Patented Aug. 13, 1901.
O. A. BRONSON.
COIN CONTROLLED WEIGHING DEVICE.
(Application filed Nov. 16, 1900.)
(No Model.) 4 Sheets—Sheet 3.
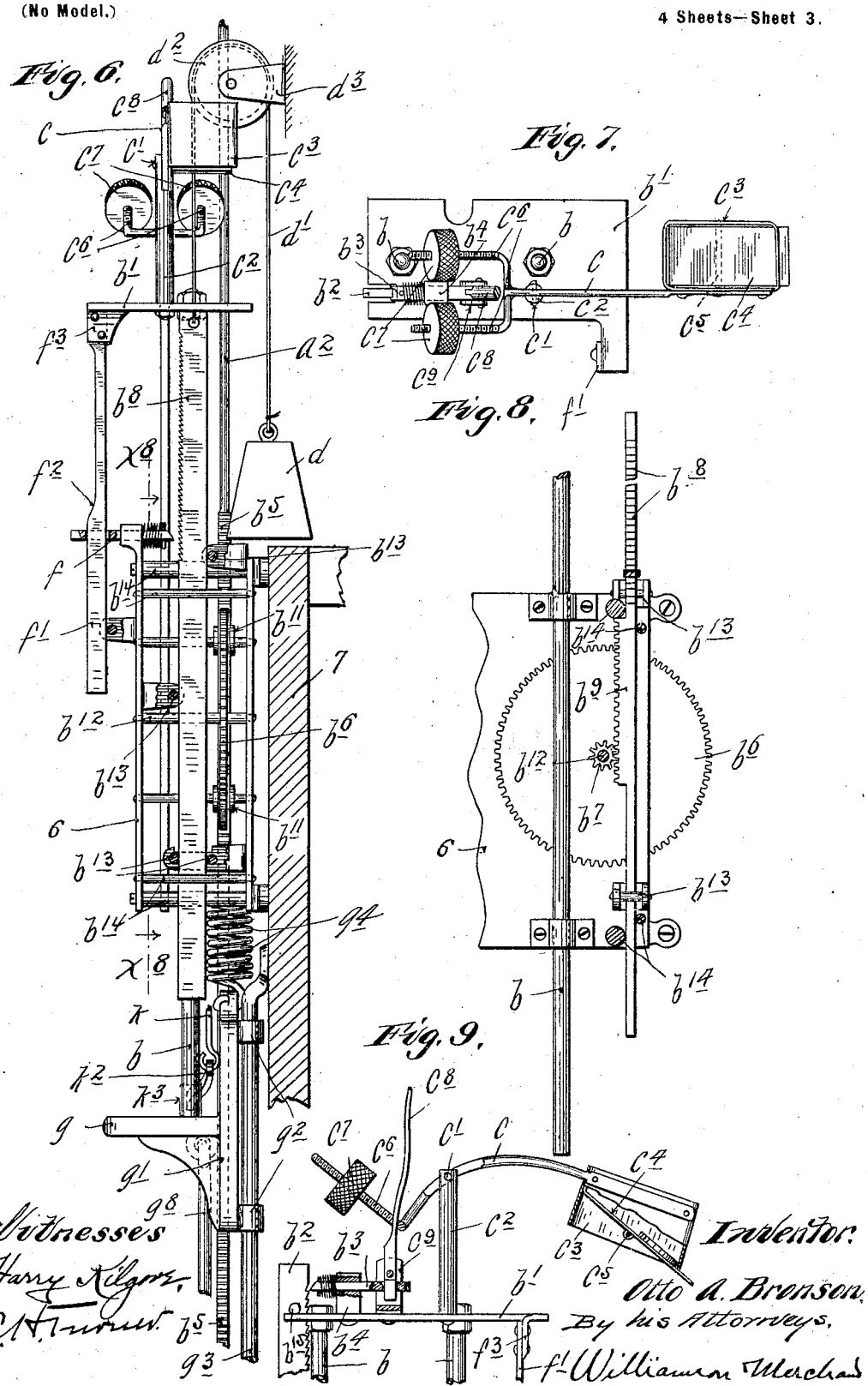

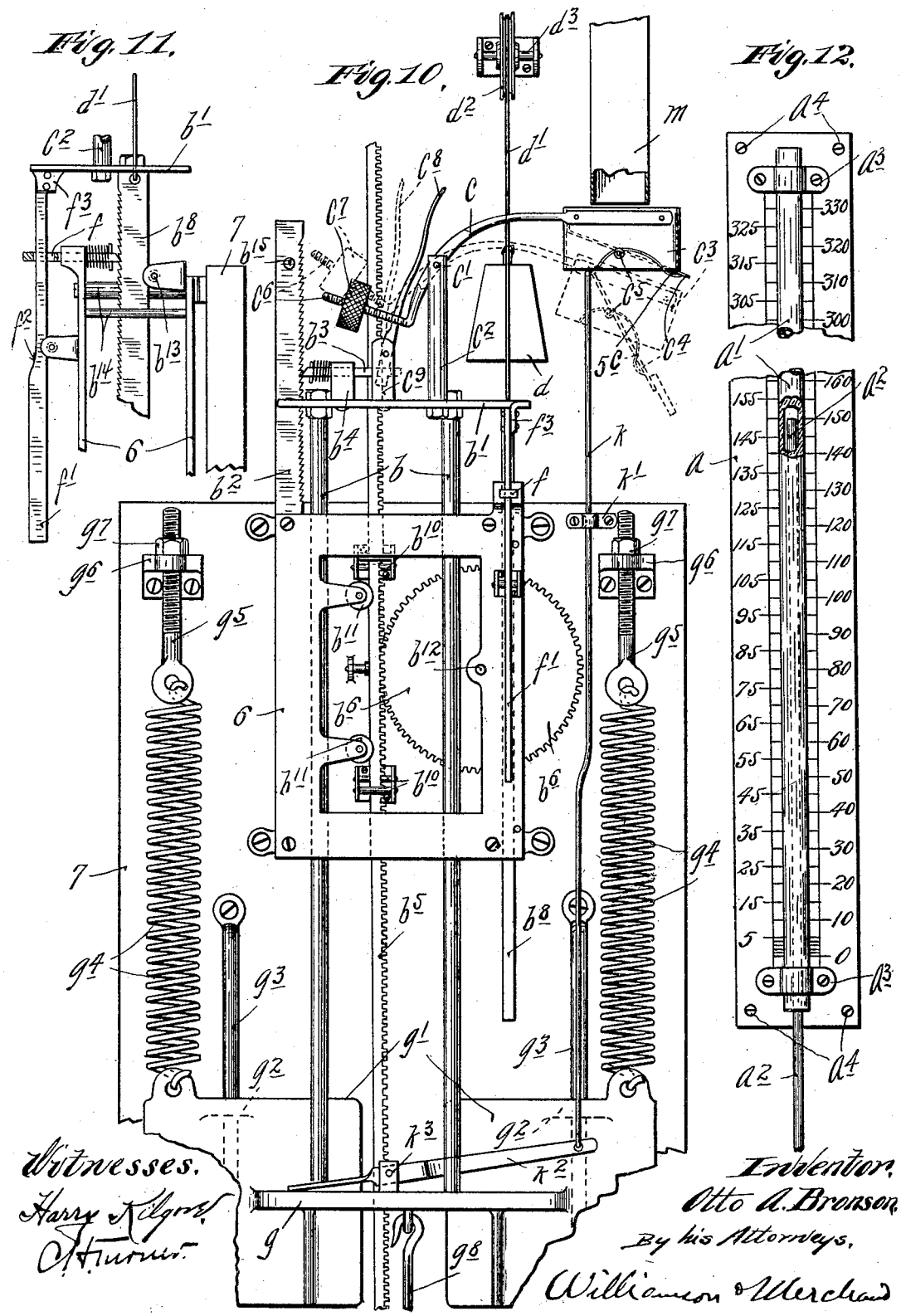

UNITED STATES PATENT OFFICE.

OTTO A. BRONSON, OF MINNEAPOLIS, MINNESOTA.

COIN-CONTROLLED WEIGHING DEVICE.

SPECIFICATION forming part of Letters Patent No. 680,221, dated August 13, 1901.

Application filed November 16, 1900. Serial No. 36,668. (No model.)

*To all whom it may concern:*

Be it known that I, OTTO A. BRONSON, a citizen of the United States, residing at Minneapolis, in the county of Hennepin and State of Minnesota, have invented certain new and useful Improvements in Coin-Controlled Weighing Devices; and I do hereby declare the following to be a full, clear, and exact description of the invention, such as will enable others skilled in the art to which it appertains to make and use the same.

My present invention relates to coin-controlled weighing devices, and has for its object to improve the same in the several particulars hereinafter noted.

The invention consists of the novel devices and combinations of devices hereinafter described, and defined in the claims.

The invention is illustrated in the accompanying drawings, wherein like characters indicate like parts throughout the several views.

Figure 1 is a front elevation with some parts broken away, showing a weighing device constructed in accordance with my invention. Fig. 2 is a side elevation of the weighing device with some parts broken away. Fig. 3 is a horizontal section on the line $x^3 x^3$ of Fig. 1. Fig. 4 is a view in front elevation, some parts being indicated in dotted-line positions and others being broken away, showing the principal portions of the automatic scale-actuated mechanism. Fig. 5 is a detail in front elevation with some parts broken away, showing the indicator removed from the case. Fig. 6 is a side elevation of the parts shown in Fig. 3, some parts being sectioned. Fig. 7 is a plan view of the mechanism shown in Figs. 4 and 6, some parts being removed. Fig. 8 is a transverse vertical section on the line $x^8 x^8$ of Fig. 6. Fig. 9 is a detail view in front elevation with some parts broken away, showing approximately the same parts which are shown in Fig. 7. Fig. 10 is a view in front elevation corresponding to Fig. 4, but illustrating different positions of the parts. Fig. 11 is a view in side elevation corresponding to some extent to Fig. 6, but illustrating different positions of the parts; and Fig. 12 is a detail view of the indicator corresponding to Fig. 5, but illustrating a different position of the indicator-rod.

So far as my invention is concerned a platform-scale of any suitable construction may be employed, and hence this platform-scale is but briefly indicated in the drawings. Of the parts thereof the numeral 1 indicates the platform on which the person is to stand, which platform actuates the scale levers or beams, which are located within the base-box 5.

In Fig. 2 the numeral 3 indicates the projecting end of one of the scale levers or beams, from which in the construction illustrated the automatic mechanism for controlling the indicator under the action of the coin is operated.

The numeral 4 indicates a vertically-extended case or cabinet, to the lower end of which is rigidly secured base-box 2.

The indicator in the construction illustrated comprises a graduated scale $a$, a transparent tube $a'$, and an indicator-rod $a^2$, which telescopes through the tube $a'$. The tube $a'$ is shown as secured to the scale $a$ by means of brackets $a^3$, and the scale is shown as secured by screws $a^4$ to the inwardly-depressed central portion 5 of the case 4.

In the best construction of the indicator-actuating mechanism it comprises what may be designated as a "primary" and a "secondary" actuator. As shown, the primary actuator comprises a pair of vertically-movable bolts $b$, rigidly connected at their upper ends by a horizontal plate $b'$ and mounted to freely slide through suitable keeper-guides of a frame or skeleton support 6, which frame is shown as rigidly secured to a backboard 7, which in turn is rigidly secured within and to the back of the case or cabinet 4. The downward or operative movement of the primary actuator is restrained by a lock, best afforded by a ratchet bar or rack $b^2$ and a coöperating spring-pressed lock-pawl $b^3$, which rack is rigidly secured to and projects vertically from the frame 6, and which pawl is mounted to slide in a keeper $b^4$, rigid on the top of the plate $b'$ of the primary actuator.

The secondary actuator in the construction illustrated comprises a long rack $b^5$, a coöperating spur-wheel $b^6$, having on its hub a small pinion $b^7$ and a vertically-movable ratchet-bar $b^8$, provided with a rack $b^9$, that meshes with the pinion $b^7$. The long rack $b^5$ is connected at its upper end to the lower end of the indicator-rod $a^2$, and it is held in mesh with the gear $b^6$ and permitted free vertical movements by means of guide-rollers $b^{10}$ and $b^{11}$, suitably mounted on the frame 6. The gear $b^6$ has trunnions $b^{12}$, which are journaled in the sides of the frame 6. The rack-bar $b^8$ is loosely mounted with freedom for vertical movements in the right-hand portion of the frame 6, as viewed in Figs. 4 and 10, and, as shown, bearings for the same are afforded by the coöperating guide-pins $b^{13}$ and $b^{14}$, which form parts of said frame 6. The coöperating guide-pins $b^{14}$ (see Figs. 6 and 8) hold the rack $b^9$ in engagement with the coöperating pinion $b^7$, while the pins $b^{13}$ hold the racks $b^8$ and $b^9$ against lateral movements toward and from the front plate of the frame 6. It will be noted that the upper end of the ratchet-bar $b^8$ engages the under side of the top plate $b'$ of the so-called "primary" actuator. It is evident that when the primary actuator moves downward it will force the said rack-bar $b^8$ also downward, and hence will operate the so-called "secondary" actuator.

The coin-actuated trip for the lock-pawl $b^3$ involves a trip-lever $c$, pivoted at $c'$ to a post $c^2$, projected vertically from the head-plate $b'$ of the so-called "primary" register-actuator. At its extended end the trip-lever $c$ is provided with a coin-receiving pocket $c^3$, having a drop-bottom $c^4$ pivoted thereto at $c^5$ and normally closed by a spring $5^c$. At its other and shorter end the trip-lever $c$ is shown as provided with a pair of laterally-spaced screw-threaded prongs $c^6$, on which balancing-weights $c^7$ work as nuts to properly counterpoise or balance the trip-lever. The weights $c^7$ are normally so adjusted that gravity will hold the trip-lever $c$ and its pocket $c^3$ in the position indicated by full lines in Figs. 4 and 10, but with such slight force as will be overcome by the falling of the coin into the pocket $c^3$ of said trip-lever. When the trip-lever $c$ is forced into the position indicated by dotted lines in Fig. 10 and by full lines in Fig. 9, the pronged end thereof engages the upper end of a pivoted intermediate lever or finger $c^8$, shown as pivoted to a small bracket $c^9$ on the head-plate $b'$ of the primary actuator. The lower end of said lever or finger $c^8$ is shown as projected through a perforation in the outer end of the lock-pawl $b^3$.

The ratchet-bar $b^8$ of the secondary indicator-actuator is normally held upward to its limit against the plate $b'$ of the primary actuator, this, as shown, being accomplished by a weight $d$, connected with the upper end of said bar by a cord $d'$, which runs over a guide-pulley $d^2$, mounted in a bracket $d^3$, suitably secured to the back of the case 4 above the backboard 7.

A spring-pressed pawl $f$, which constitutes a lock, coöperates with the ratchet-teeth of the bar $b^8$ to prevent return movement thereof except when the said pawl is drawn outward. The said pawl is drawn outward to release the ratchet-bar $b^8$ when the primary actuator is in its normal position by means of a cam-bar $f'$, having an inclined cam-surface $f^2$. The upper end of this bar $f'$ is rigidly secured to a depending flange $f^3$ of the head-plate $b'$, and the depending portion thereof works through an elongated perforation in the said pawl $f$.

The amount of movement to be given to the primary actuator and through the secondary actuator to the indicator-rod $a^2$ is of course proportional to the weight of the person on the scale-platform 1. Hence this movement is predetermined by the position of the so-called "actuator-stop," which is subject to the scale-lever mechanism. Advisably the actuator-stop is in the form of a horizontally-extended stop-plate $g$, formed integral with vertical end plates $g'$, provided with bearing-lugs $g^2$, that slide freely on vertical guide-rods $g^3$, secured at their ends to the back-board 7. The stop-plate $g$ is yieldingly held upward to its limit by a pair of coiled springs $g^4$, the lower ends of which are connected to the end plates $g'$ and the upper ends of which are provided with or secured to screw-bolts $g^5$, projected through lugs $g^6$ on the back-board 7 and provided with adjusting-nuts $g^7$. The stop-plate $g$ is connected by a rod $g^8$ to the free end of the scale-lever 3, previously noted.

To trip or tilt the drop-bottom of the coin-pocket $c^3$ of the trip device already described a releasing device is provided, which as preferably constructed comprises a vertically-movable rod $k$, which works through a guide $k'$ on the backboard 7 and is pivoted at its lower end to a lever $k^2$, which in turn is pivoted to a lug $k^3$ on the stop-plate $g$. The shorter end of the lever $k^2$ stands below and in position to be engaged by the lower end of the left-hand rod $b$ of the so-called "primary" actuator. Normally the springs $g^4$ hold the stop-plate $g$ upward to its limit, with the free end of the lever $k$ pressed against the lower end of the coöperating rod $b$, and through this engagement force the primary actuator upward to its limit, this limit, as shown, being determined by the engagement of the head-plate $b'$ with a stop $b^{15}$ on the fixed ratchet-bar $b^2$. The normal positions of the parts are indicated by full lines in Figs. 4, 5, 6, 7, and 8. It will be remembered that the parts of the so-called "secondary" register-actuator—to wit, ratchet-bar $b^8$, rack $b^9$, gears $b^6$ and $b^7$, and rack $b^5$, as well as the indicator-rod $a^2$—are returned to their normal postions and there yieldingly held by the action of the weight $d$.

$m$ indicates the coin-delivery chute or spout.

Operation: The person to be weighed steps upon the scale-platform 1, and his weight is then rendered effective to draw downward the actuator stop-plate $g$ more or less, according to his weight, thereby setting the stop-plate in advance of the movement of the indicator-actuating mechanism and predetermining the subsequent movement thereof and of the indicator-rod $a^2$. Up to this time no movement whatever of the indicator-actuator has taken place, or, in fact, could take place, since said mechanism is locked by the pawl $b^3$. The person to be weighed while standing on the platform 1 drops the coin—which we will assume is a penny—into the coin-chute $m$. The coin from the chute $m$ drops directly onto the pivot between the bottom $c^4$ and the lever-pocket $c^3$, and thereby forces the trip-lever $c$, intermediate lever $c^8$, and lock-pawl $b^3$ into the position indicated in Fig. 9. The coin strikes the bottom $c^4$ in the vicinity of its pivot, and hence said bottom is not opened by the momentum thereof. Hence the lock-pawl $b^3$ is held in its releasing position for the time being and the primary indicator-actuator is permitted to fall to the predetermined limit, as determined by the position of the stop-plate $g$. Under the downward movement of the primary actuator its head-plate $b'$ engages and forces downward the ratchet-bar $b^8$ and rack $b^9$ of the secondary actuator, and through the gears $b^6$ and $b^7$ and rack $b^5$ the indicator-rod $a^2$ is raised to give the proper indication on the scale $a$. Assuming the person's weight to be one hundred and fifty pounds, the stop-plate $g$ would be moved into the position indicated by dotted lines in Fig. 4 and by full lines in Fig. 10. With the stop-plate $g$ moved as indicated the indicator-actuating mechanism, when permitted to move from its normal position into the position indicated in Fig. 10, will cause the indicator-rod $a^2$ to be moved upward within the tube $a'$, as indicated in Fig. 12, so that its upper end is in line with the one-hundred-and-fifty-pound mark on the scale $a$. The indicator-rod $a^2$ would advisably be colored, so as to make its position more readily observed. At the limit of the predetermined downward movement of the primary actuator the lower end of the left-hand rod $b$ strikes the free end of the lever $k^2$, and thereby forces upward the coin-releasing rod $k$, the upper end of which rod engages the inner end of the drop-bottom $c^4$ of the coin-box $c^3$, thereby tilting said bottom, as indicated in Fig. 10, and permitting the coin to drop into a suitable receptacle. (Not shown.) As soon as the trip-lever $c$ is relieved of the weight of the coin it is by its weights $c^7$ thrown back into its normal position, thereby releasing the lock-pawl $b^3$ and permitting said pawl to positively lock the indicator-actuating mechanism against further operative movement, as indicated by full lines in Fig. 10. Hence it is evident that if a second person or heavier person than the first steps upon the platform 1 a second weight cannot be indicated without first dropping a second coin to release the lock-pawl $b^3$. The initial downward movement of the primary actuator carries the cam-surface $f^2$ of the bar $f'$ below the lock-pawl $f$, and thereby permits the said pawl to engage the teeth of the ratchet-bar $b^8$. The said pawl $f$ permits the ratchet-bar $b^8$ to be moved downward as far as it may be forced by the plate $b'$ of the primary actuator and locks the same in the lowest position into which it is forced. This pawl $f$ therefore serves to lock the ratchet-bar $b^8$ and parts connected therewith, including the indicator-rod $a^2$, against return movement in case a lighter person should step onto the platform 1 in place of the person whose weight has been indicated. When the person whose weight has been indicated steps from the platform 1, the stop-plate $g$ under the action of the springs $g^4$ is moved upward and back to normal position, thereby forcing upward the rods $b$ and head $b'$, which constitute in the illustration given the primary actuator. As this primary actuator closely approaches its extreme uppermost or normal position the cam-surface of the depending bar $f'$ again acts upon the lock-pawl $f$ and releases the same from the teeth of the ratchet-bar $b^8$, whereupon the weight $d$ is permitted to become active to restore the parts of the secondary actuator and the indicator-rod $a^2$ to their normal positions.

What I claim, and desire to secure by Letters Patent of the United States, is as follows:

1. The combination with a scale-platform, of an indicator, an indicator-actuating mechanism, a lock for restraining the operative movement of said actuating mechanism, a coin-controlled trip operating to release said lock, means for causing said lock to again become active only at the predetermined limit of movement of said actuating mechanism, another lock for preventing the returning movement of said indicator, a releasing device for said latter lock, and means whereby said releasing device is operated by the upward movement of the scale-platform.

2. The combination with a scale-platform, of an indicator, a primary and a secondary indicator-actuator, a lock restraining the operative movement of said primary actuator, means whereby the operative movement of said primary actuator imparts an operative movement to said secondary actuator, a coin-controlled trip operating to release said lock, means for causing said lock to again become active at the predetermined limit of movement, another lock for holding said secondary actuator against return movement, a releasing device for said latter lock, means whereby the return movement of said primary actuator operates said releasing device, and a limiting-stop controlled by said scale-platform and arranged to be set in advance to limit and predetermine the operative movement of said primary actuator.

3. The combination with a scale-platform, of an indicator, a primary and a secondary indicator-actuator, movable the one with respect to the other; a pawl-and-ratchet lock limiting the operative movement of said primary actuator, means whereby said primary actuator operates said indicator through said secondary actuator, a coin-controlled trip for releasing the pawl of said lock, means for permitting said pawl to become active again at the predetermined limit of the scale indication, a pawl-and-ratchet lock for holding said secondary actuator against return movement, a releasing device for the pawl of said latter lock, means whereby said releasing device is actuated by the final return movement of said primary actuator, and a limiting-stop controlled by said scale-platform, and arranged to be set in advance to variably limit and predetermine the operative movement of the primary actuator.

4. The combination with the scale-platform, of an indicator, a primary and secondary actuator for said indicator, means whereby the former actuator imparts an operative movement to the latter but has an advance return movement, a pawl-and-ratchet lock restraining the operative movement of said primary actuator, a coin-controlled trip for the pawl of said lock, having the coin-pocket with a drop-bottom, a pawl-and-ratchet lock restraining the return movement of said secondary actuator, a releasing device for the pawl of said latter lock actuated by the final return movement of said primary actuator, an actuator stop or controller controlled by the scale-platform and arranged to be set in advance to variably intercept and predetermine the movement of said primary actuator, an automatic releasing device operative on the drop-bottom of said coin-trip, and means whereby said release device is itself rendered operative by said register-actuator, at the limit of its predetermined movement.

5. The combination with an indicator, of an indicator-actuator, a stop for said actuator, adapted to be set in advance to predetermine the movement of said actuator, means for releasing said actuator after said stop has been set, and means for automatically locking said actuator against return movement at the limit of its predetermined operative movement.

In testimony whereof I affix my signature in presence of two witnesses.

OTTO A. BRONSON.

Witnesses:
MABEL M. McGRORY,
F. D. MERCHANT.